United States Patent
Buehler

(10) Patent No.: US 6,206,091 B1
(45) Date of Patent: *Mar. 27, 2001

(54) PROCESS AND APPARATUS FOR TREATING WASTE

(75) Inventor: Verne T. Buehler, Waukesha, WI (US)

(73) Assignee: United States Filter Corporation, Palm Desert, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/256,595

(22) Filed: Feb. 23, 1999

Related U.S. Application Data

(63) Continuation-in-part of application No. 08/851,645, filed on May 6, 1997.

(51) Int. Cl.$^7$ .................................................. F28F 9/26
(52) U.S. Cl. .......................... 165/143; 165/108; 210/609
(58) Field of Search ................................. 165/162, 143, 165/163, 108, 154, 104.11; 210/609

(56) References Cited

U.S. PATENT DOCUMENTS

| | | | |
|---|---|---|---|
| 1,051,383 | 1/1913 | Bosse | 165/154 |
| 1,456,557 | 5/1923 | Imhoff . | |
| 2,259,433 | 10/1941 | Kitto | 165/154 |
| 2,847,379 | 8/1958 | Spiegel et al. | 210/6 |
| 2,975,122 | 3/1961 | Laboon | 210/12 |
| 3,253,326 | 5/1966 | Henry et al. | 165/154 |
| 3,477,501 | 11/1969 | Van Es | 165/154 |
| 3,487,015 | 12/1969 | Boester | 210/12 |
| 3,697,417 | 10/1972 | Teletzke et al. | 210/609 |
| 3,838,199 | 9/1974 | Coe et al. | 426/55 |
| 3,913,500 | 10/1975 | Paccione et al. | 110/8 F |
| 3,920,068 | 11/1975 | Walsh et al. | 165/143 |
| 3,959,125 | 5/1976 | Teletzke | 210/10 |
| 3,972,811 | 8/1976 | Larkins, Jr. et al. | 210/71 |
| 4,140,150 | 2/1979 | Rundell | 165/154 |
| 4,210,199 | 7/1980 | Doucette et al. | 165/143 |
| 4,493,770 | 1/1985 | Moilliet | 210/603 |
| 4,511,370 | 4/1985 | Hunzinker et al. | 48/197 |
| 4,557,332 | 12/1985 | Nipple | 165/154 |
| 4,975,195 | 12/1990 | Urbani | 210/608 |
| 5,063,994 | 11/1991 | Verkaart | 165/154 |
| 5,174,369 | 12/1992 | Glass | 165/154 |
| 5,207,911 | 5/1993 | Pellegrin et al. | 210/603 |
| 5,375,654 | 12/1994 | Hougland et al. | 165/154 |
| 5,511,384 | 4/1996 | Likitcheva | 165/154 |
| 6,047,768 | * 4/2000 | Buehler, III | 115/143 |

FOREIGN PATENT DOCUMENTS

| | | | |
|---|---|---|---|
| 672780 | 12/1989 | (CN) | C02F/11/08 |
| 0179234 | 4/1987 | (DE) | C02F/11/04 |
| 909872 | 4/1961 | (GB) . | |

OTHER PUBLICATIONS

Bulletin ATP–594–2.5M The Walker Aerotherm System, CBI Walker, Inc. Aerobic Thermophilic Pretreatment, Copyright 1994.

Sludge Processing—Sturgeon Bay Adopts Biosolids Beneficial Reuse Strategy; Author Howard Hinterthuer; Jan. 1998 Issue Water/Engineering & Management, pp. 20–23.

(List continued on next page.)

Primary Examiner—Christopher Atkinson
(74) Attorney, Agent, or Firm—Michael, Best & Friedrich LLP

(57) ABSTRACT

An apparatus and method for the treatment of waste solids that allows for the direct transfer of heat between hot waste solids and cold waste solids in a tube-in-tube heat exchanger. Cold solid waste is moved from a cold solid waste source through one tube of the heat exchanger, and hot solid waste is move from a hot solid waste source through the other tube of the tube-in-tube heat exchanger, and heat is transferred from the hot solid waste to the cold solid waste. The waste treatment, including the heat exchange, can occur in a batch mode or in a continuous mode.

23 Claims, 4 Drawing Sheets

OTHER PUBLICATIONS

Alfa–Laval American Heat Sludge Spiral Heat Exchangers, Allan Engineering Company, Inc. Catalog SA 1600 6/82 HR 3M.

Chapter 9. Thermophilic Pre–Stage Process EPA/625/10–90/007 Sep. 1990, pp. 57–62.

Alpha–Biotherm—Converting Sewage Sludge Into Premium Agricultural Compost and Fertilizer, Alpha Environmental Technology Ltd.

Sludge Treatment, WRc Investigates Multi–Stage Sludge Digestion, by Rod Palfrey, Feb., 1992, pp. 43–47.

Water Environment & Technology, Sludge Stabilization, Effects of Aerobic Thermophilic Pretreatment, by Urs Baier and Hans Peter Swiefellhofer, Jan., 1991, pp. 57–61.

Envirex, Wastewater Treatment Equipment and Processes, Bulletin 315–24A, DuoTherm, pp. 1–4.

* cited by examiner

| TABLE 1 [1] | | | | | | | | |
|---|---|---|---|---|---|---|---|---|
| | TEST 1 | | TEST 2 | | TEST 3 | | TEST 4 | |
| | INFLUENT | EFF. | INFLUENT | EFF. | INFLUENT | EFF. | INFLUENT | EFF. |
| COLIFORM MPN/g | $9.45 \times 10^6$ | 870 | $1.82 \times 10^7$ | 870 | $1.00 \times 10^7$ | 480 | $9.86 \times 10^6$ | 480 |
| sCOD, mg/l | 2,950 | 8,850 | 3,440 | 8,840 | 5,440 | 14,500 | 5,090 | 16,700 |
| $sNH_3$, mg/l | 110 | 110 | 140 | 100 | 170 | 170 | 140 | 180 |
| sTKN, mg/l | 180 | 790 | 250 | 780 | 370 | 1,250 | 320 | 1,340 |
| TS (%) | 2.15 | 2.28 | 2.34 | 2.57 | 4.47 | 4.81 | 4.53 | 4.91 |
| TDS, mg/l | 1,710 | 4,658 | 2,050 | 4,510 | 3,510 | 9,120 | 3,240 | 9,780 |
| TSS, mg/l | 23,000 | 21,700 | 24,000 | 22,800 | 42,200 | 41,000 | 35,000 | 37,500 |
| TVSS, mg/l | 88 | 88.2 | 88.8 | 88 | 88.7 | 86.4 | 86.2 | 88 |

| TABLE 2 [1] | | |
|---|---|---|
| AVERAGED RESULTS | | |
| | INFLUENT | EFF. |
| COLIFORM MPN/g | $11.9 \times 10^6$ | 675 |
| sCOD, mg/l | 4,230 | 12,200 |
| $sNH_3$, mg/l | 140 | 140 |
| sTKN, mg/l | 280 | 1,040 |

| TABLE 3 [1] | | | |
|---|---|---|---|
| TEST NUMBER | Δ sCOD mg/l | Δ sTKN mg/l | Δ sTKN/ Δ sCOD |
| TEST 1 | 5,900 | 610 | 10.3 % |
| TEST 2 | 5,400 | 530 | 9.8 % |
| TEST 3 | 9,060 | 880 | 9.7 % |
| TEST 4 | 11,610 | 1,020 | 8.8 % |

1) ALL TESTS WERE CONDUCTED AT 150° F FOR ONE HOUR

TABLE 4

| | ANAEROBIC DIGESTION AT 95° F | THERMAL CONDITIONING AT 150° F FOLLOWED BY ANAEROBIC DIGESTION AT 95° F |
|---|---|---|
| TOTAL CONVECTIVE HEAT LOSS | 0.16 MBtu/hr | 0.16 MBtu/hr |
| INCOMING SOLIDS | 0.76 MBtu/hr | 1.53 MBtu/hr |
| HEAT RECOVERED | 0.0 Btu/hr | 0.77 MBtu/hr |
| AVERAGED RESULTS | 0.92 MBtu/hr | 0.92 MBtu/hr |

Fig. 4

PROCESS AND APPARATUS FOR TREATING WASTE

This is a continuation-in-part of application Ser. No. 08/851,645 filed May 6, 1997, entitled "Process and Apparatus for Treating Waste" which is incorporated herein by reference.

FIELD OF THE INVENTION

This invention generally relates to a method and apparatus for the treatment of waste solids, and more particularly to a method and apparatus for the treatment of waste solids that allows for the transfer of heat between hot waste solids and cold waste solids.

BACKGROUND OF THE INVENTION

Known methods of processing waste solids such as sewage sludge often involve the use of thermal energy or the production of thermal energy during one or more stages of a treatment process. For example, thermal conditioning may be used in such a manner as to improve the dewaterability of the sludge so that the solid and liquid phases are readily separated, as by sedimentation, filtration, and centrifugation. See, for example: U.S. Pat. No. 3,256,179 issued to Teletzke et al.; U.S. Pat. No. 3,697,417 issued to Teletzke et al.; and U.S. Pat. No. 3,824,186 issued to Erickson et al.

Other methods have been used to obtain heat by the biological decomposition of organic substances and to treat sludge by sterilization. See, for example: U.S. Pat. No. 4,493,770 issued to Moillet, and U.S. Pat. No. 3,959,125 issued to Teletzke.

For economic and environmental reasons, it is desirable to recover and reuse heat produced or used during the treatment of solid waste. Various methods and systems have been proposed to recover such heat energy. Traditional heat recovery systems often used an indirect two step heat transfer process wherein the first step involved transferring heat from treated hot solid waste to water in a first heat exchanger. In a second step, the heat in the water is then transferred to untreated cold waste solids in a second heat exchanger. Such systems are complicated, expensive, and inefficient.

Some heat recovery systems may employ a stainless steel tank placed inside of a larger stainless steel tank wherein each tank acts as a solid waste batch storage tank while heat is being transferred through the wall between the two sludge tanks. The heat is being transferred between the hot solid waste and cold solid waste without the use of an intermediate water media. Often, mechanical mixers are used to agitate the solid waste in each tank to facilitate the heat transfer. These heat recovery systems have very high fabrication costs, are very complex, have high ceiling requirements, and are difficult to maintain and clean. Additionally, the mechanical mixers have the further drawback of becoming clogged over time. As the mixers become clogged or as sludge scale coats the walls of the chambers, it becomes necessary to disassemble and clean the tanks to restore adequate heat transfer efficiency. Disassembly shuts down the whole system.

Spiral heat exchangers have also been used in sludge to sludge heat transfer applications, but present the problems of clogging and high maintenance requirements.

SUMMARY OF THE INVENTION

Accordingly, it is an object of the invention to overcome the shortcomings of the prior art by providing a method and apparatus for treating waste wherein heat can be effectively transferred from hot solid waste to cold solid waste without the use of an intermediate water media.

The invention provides a method and apparatus wherein a heat exchanger such as a tube-in-tube heat exchanger is used for transferring heat between one volume of sludge to a second volume of sludge. In one application, cold solids waste is moved or passed through one tube of a tube-in-tube heat exchanger, and hot solids waste is moved or passed through the annular space (i.e., the other tube) of the tube-in-tube heat exchanger, and heat is transferred from the hot solid waste to the cold solid waste. Although tube-in-tube heat exchangers are known for use in other, different applications, Applicant believes that they have never been used for a solid waste to solid waste heat transfer application as in the present invention. It is thought by Applicant that heat exchangers, particularly tube-in-tube heat exchangers, have never been used for a solid waste to solid waste heat transfer application because such an application was believed to be unworkable by those skilled in the art.

One aspect of the invention includes a method of treating waste. The method includes the acts of: (a) providing a cold waste solids source for maintaining cold waste solids, a hot waste solids source separate from the cold waste solids source for maintaining hot waste solids, and a heat exchanger (e.g., a tube-in-tube heat exchanger) remotely located from and connected to the cold waste solids source and the hot waste solids source; (b) passing a volume of cold waste solids from the cold waste solids source through the heat exchanger; (c) passing a volume of hot waste solids from the hot waste solids source through the heat exchanger to transfer heat from hot waste solids to cold waste solids; and (d) passing at least a portion of one of the volumes of cold and hot waste solids passed through the heat exchanger a second time through the heat exchanger to transfer heat from hot waste solids to cold waste solids.

Another aspect of the invention is to provide for a method for treating waste as discussed above that can be performed in a continuous manner.

It is another object of the invention to provide for an apparatus that may be used in a continuous treatment process.

It is another object of the invention to provide an apparatus for treating waste including a tube-in-tube heat exchanger that can be used for a direct solid waste to solid waste heat transfer application.

It is yet another object and feature of the invention to provide a method for treating waste using a heat exchanger wherein a volume of cold waste solids and a volume of hot waste solids are passed through separate conduits, channels or tubes of the heat exchanger, and wherein at least a portion of one of the volumes of waste solids (hot or cold) is passed through the heat exchanger more than once and, preferably, at least twice. In one embodiment of the invention, the cold and/or hot waste solids is passed through the heat exchanger and then returned to the cold and/or hot waste solids source. This may be referred to as recirculating the waste solids.

Several objects and advantages are realized by passing waste solids through the heat exchanger at least twice and/or to recirculate waste solids between the heat exchanger and the waste solids source (i.e., returning the waste solids to the waste solids source). One object realized is to be able to vary heat transfer capacities of the method and system using a single size heat exchanger. Another object is to minimize the heat transfer area and the size of heat exchanger required. This results in a smaller heat exchanger that will typically require a lesser number of return bends and, thus, require less maintenance. Further, the smaller heat exchanger will cost less than the typical heat exchanger.

One specific operational advantage of the method described above is that the waste solids may be recirculated for different periods of time in order to vary the temperature of waste solids. In one application that is explained in greater detail below, at least a portion of the waste solids is passed through the heat exchanger multiple times before being passed into a thermal conditioning tank, an anaerobic digester or other downstream process vessel or location. Such flexibility is not achievable with a one pass-through type system since the temperature of the waste solids is determined after the first pass through the heat exchanger. Further, the temperature of the waste solids passed to the anaerobic digester or other process vessel may have been varied to account for seasonal fluctuations and heating requirements. However, because the "multiple pass" or "recirculating" heat exchanger system is capable of obtaining varying heat transfer capacities, only one heat exchanger is necessary.

In a more specific example of an operational advantage attainable with the present invention, additional cooling and/or heating equipment is not required for the anaerobic digester. For a one-pass heat exchanger, the temperature of the waste solids passing to the anaerobic digester may be too cold or too hot in order to maintain the optimum digestion temperature. If the once through heat exchanger is sized based on winter conditions, the waste solids would be too hot during the summer and, thus, disrupt the anaerobic digestion process. In order to prevent the digestion process from being upset, an additional cooling type heat exchanger is typically utilized in order to cool the hot solids down to the appropriate temperature with a cooling fluid (such as water). Conversely, if the heat exchanger is sized based on summer conditions, the temperature of the solids going through the anaerobic digester would be too cold as sufficient heat would not be supplied. In this case, additional heating equipment would be required to maintain the anaerobic digester at the proper temperature. Thus, the ability to control the digester temperature with the recirculating heat recovery system eliminates the need for additional temperature control equipment. The present method and system is therefore clearly more economical.

Other objects and features of the present invention will become apparent to those skilled in the art upon review of the following detailed description, drawings, and claims.

BRIEF DESCRIPTION OF THE DRAWINGS

FIG. 4 illustrates tables related to the process described herein.

DETAILED DESCRIPTION OF EMBODIMENTS OF THE INVENTION

The invention relates generally to solid waste treatment apparatus and processes for solid waste treatment, and to a heat recovery apparatus and process used in solid waste treatment. The heat recovery apparatus and method of the current invention may be used whenever there is a temperature difference between sludge at different stages of a treatment process and it is desirable to recover heat from one body of sludge by transferring the heat to another body of sludge. The heat recovery is especially useful in multistage treatment processes wherein heat is imparted into the sludge in an earlier stage, but the heat is not needed or desired in a later stage. The heat is then transferred through a tube-in-tube heat exchanger from the sludge leaving the earlier stage to sludge entering the earlier stage to pre-warm the sludge entering the earlier stage.

As used herein "hot solid waste" shall mean solid waste in a given treatment process that includes thermal energy that is desired to be recovered through heat transfer. "Cold solid waste" shall mean solid waste in a given treatment process to which it is desirable to impart additional thermal energy. Preferably, in any given treatment process or apparatus, the hot solid waste has a temperature greater than the temperature of the cold solid waste.

Figure 1:
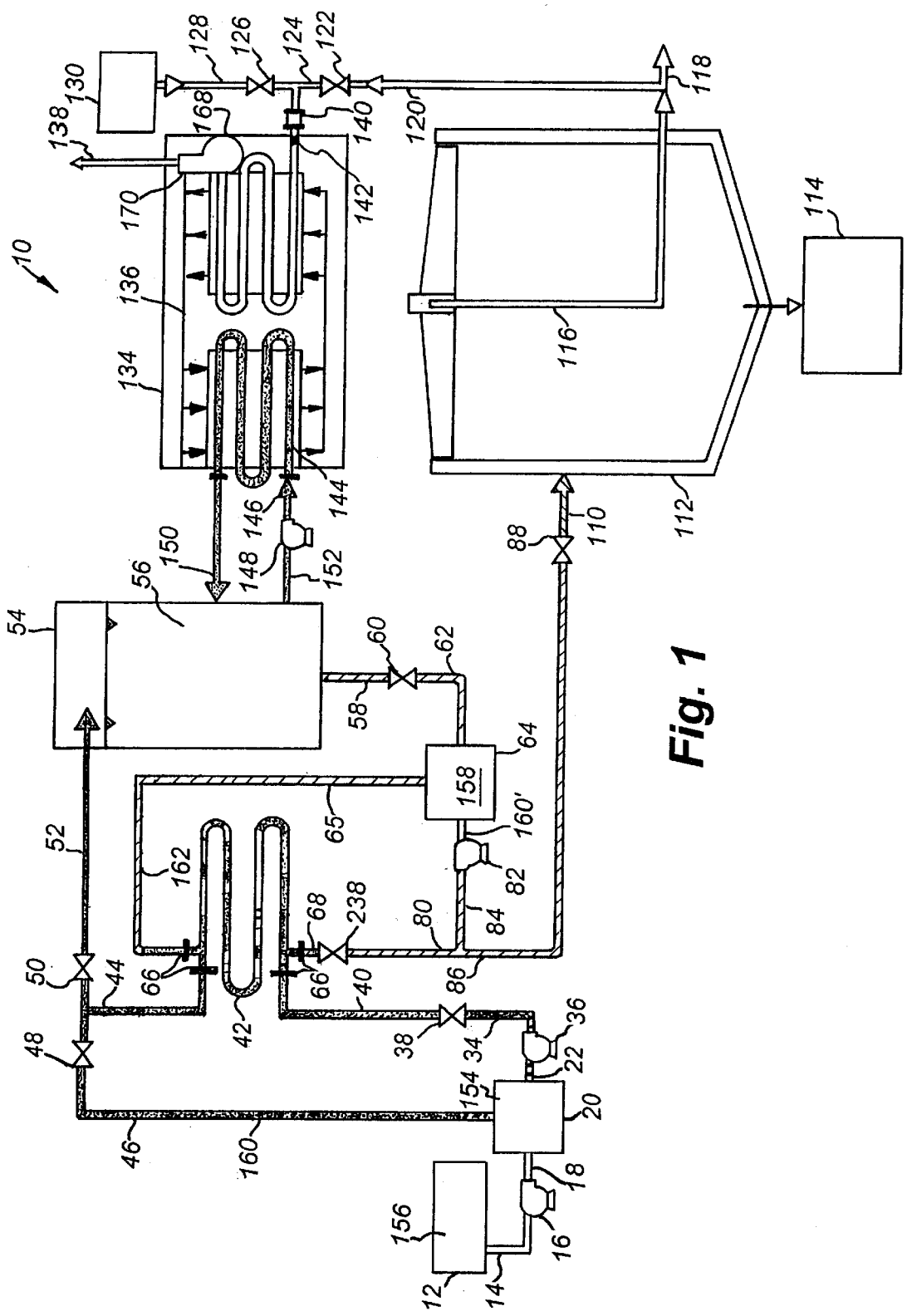
FIG. 1 is a schematic view of an apparatus for treating waste embodying the present invention.

FIG. 1 is a schematic representation of one embodiment of the invention including an apparatus 10 for treating waste. In this embodiment, sludge or waste solids are being treated in a two stage treatment process wherein the first stage is a thermal conditioning step without biological activity, and the second stage is an anaerobic digestion step. It is desirable that the sludge in the thermal conditioning step be heated to a certain temperature, and that the sludge in the biological activity step be cooler than the sludge in the thermal conditioning step. Therefore, it is desirable to transfer heat from the sludge exiting the thermal conditioning step to sludge entering the thermal conditioning step.

Apparatus 10 includes cold waste solids tank 20 for retaining cold solids batch 154, and new cold solids batch 156 and pre-warmed solids batch 160. Cold solids batch(es) 156 are transferred from thickener or storage tank 12 by way of conduit 14 (a pipe or channel) to pump 16 which pumps batch(es) 156 into cold waste solids tank 20. Cold waste solids tank 20 is attached to conduit 46 (a pipe or channel). Conduit 46 has valve 48 connected to tee 44. Tee 44 is connected to valve 50 which is attached to pipe or conduit 52. Conduit 52 is connected to a conditioning tank 54. In the embodiment shown, the conditioning tank 54 is a thermal conditioning tank, but when other processes are used, the conditioning tank used will be the appropriate type of tank for the process used.

Thermal conditioning tank 54 is separated from and remotely located from cold waste solids tank 20. Pipe 46, valve 48 and tee 44 are used to transfer cold solids batch 154, and new cold solids batch 156, and pre-warmed solids batch 160 from heat exchanger 42 to cold waste solids tank 20 during operation of apparatus 10. Pipe 22 is connected to pump 36. Pump 36 is connected to pipe 34. Pipe 34 is connected to valve 38. Valve 38 is connected to pipe 40. Pipe 40 is connected to heat exchanger 42 at coupling 66.

During an optional start-up procedure, cold waste solids batch 154, water, or some other suitable start up material is transferred to thermal conditioning tank 54. It is also possible to substitute an initial batch of water or some other suitable material for the start-up procedure. During this mode of operation the start up material, travels from cold waste solids tank 20 through pipe 22. Valves 38 and 50 are in an open position, and valve 48 is in a closed position. Cold waste solids batch 154 is then pumped by pump 36 through pipe 34, valve 38, pipe 40, coupling 66, heat exchanger 42, coupling 66, tee 44, valve 50 and conduit 52 into thermal conditioning tank 54. In a variant, water or some other suitable material is directly transferred from a source to thermal conditioning tank 54.

In a re-circulating mode of operation of apparatus 10, cold waste solids batch 154 or pre-warmed solids batch 160 is re-circulated. Valve 50 is in a closed position. Valves 38 and 48 are in an open position. During this mode of operation, cold waste solids batch 154 or pre-warmed solids batch 160 travels from cold waste solids tank 20 through pipe 22. Valves 38 and 48 are in an open position, and valve 50 is in a closed position. Cold waste solids batch 154 or pre-warmed solids batch 160 is then pumped by pump 36 through pipe 34, valve 38, pipe 40, coupling 66, heat exchanger 42, coupling 66, tee 44, valve 48, pipe 46 into cold waste solids tank 20. The cycle is repeated and cold waste solids batch 154 or pre-warmed solids batch 160 travels through the circuit described above repeatedly.

Thermal conditioning tank 54 is connected to thermal conditioner or heater 134 by way of egress pipe 152. Egress pipe 152 is connected to pump 148 which pumps conditioned hot waste solids 56 (and other solids in tank 54) through pipe 146 to heater 134. Heater 134 warms cold solids batch 154 or other solids located in thermal conditioning tank 54 to an effective thermal conditioning temperature. After the conditioning process, colds solids batch 154 or other solids in thermal conditioning tank 54 become conditioned hot waste solids 56. Conditioned hot waste solids 56 are substantially pathogen free.

Thermal conditioning tank 54 is connected to hot waste solids tank 64 by pipe 58, valve 60, and pipe 62. Hot waste solids tank 64 is separate from cold waste solids tank 20 and thermal conditioning tank 54. It is appreciated that separation of cold waste solids tank 20, from hot waste solids tank 64, and from thermal conditioning tank 54 allows for simplified construction of thermal conditioning tank 54 and for ease of maintenance and replacement of tanks 20, 54, and 64 due to regular usage of the tanks.

Valve 60 in cooperation with an optional pump (not shown) provides for the batch transfer of conditioned hot waste solids 56 from thermal conditioning tank 54 to hot waste solids tank 64. The batch transfer of conditioned hot waste solids 56 from thermal conditioning tank 54 to hot waste solids tank 64 is used to obtain conditioned hot waste solids batch 158 that will be used to transfer heat to pre-warmed solids batch 160.

Thickener or storage 12 is used to store a plurality of new cold solids batches 156 until needed. Cold waste solids tank 20 is filled with a single cold solids batch 154 by way of pipe 14, pump 16, and pipe 18 which provide filling means to fill cold waste solids tank 20 with a cold solids batch 154.

Cold waste solids tank 20 is connected to pipe 22. Pipe 22 is connected to pump 36 which is connected to valve 38. Valve 38 is connected to pipe 40. Pipe 40 is connected to one end of heat exchanger 42 at coupling 66. At the other end of heat exchanger 42, tee 44 is connected to coupling 66. Tee 44 is connected to valve 48 which is connected to pipe 46. The pipe and valve network provides for solids return to cold waste solids tank 20.

Heat exchanger 42 is remotely located from and connected to cold waste solids tank 20 and hot waste solids tank 64 by the pipe and valve network described herein. Hot waste solids tank 64 is connected to heat exchanger 42 with connecting pipe 160' which is connected to pump 82. Pump 82 is connected to tee 80, and pipe 84 is connected to tee 80. On one end of tee 80 is connected to valve 238. Valve 238 is connected to pipe segment 68. Pipe segment 68 is connected to coupling 66 which is connected to heat exchanger 42.

It is appreciated that the externalization of heat exchanger 42 from thermal conditioning tank 54, cold waste solids tank 20 and hot waste solids tank 64 provides for ease of maintenance of heat exchanger 42 and each of the respective tanks 20, 54 and 64. There is a significant decrease in the cost of manufacture and complexity of thermal conditioning tank 54 when heat exchanger 42 and heater 134 are externalized therefrom. Thermal conditioning tank 54 does not require the introduction of air into the thermal conditioning tank 54 during operation thereof.

It is appreciated that greater efficiencies are obtained in the transfer of heat from hot waste solids batch 158 to pre-warmed solids batch 160 to obtain a warmed solids batch 160 using externalized heat exchanger 42. Hot waste solids batch 158 becomes partially cooled solids batch 162. It is also appreciated that greater efficiencies are obtained in the transfer of heat from partially cooled waste solids batch 162 to cold solids batch 154 to obtain a pre-warmed solids batch 160 using externalized heat exchanger 42. Partially cooled waste solids batch 162 becomes fully cooled solids batch 162. Further, these direct heat exchanges also increase heat transfer efficiencies since an intermediate medium such as water is not used.

In the normal mode of operation, there is efficient heat transfer due to the "staggered" heat recovery process described herein which provides a substantial temperature difference and thus a heat transfer driving force. Initially, cold solids batch 154 can be at room temperature, at an outdoors temperate, or in the range of about 40° F. to about 70° F. A single cold solids batch has been heated by two independent batches of conditioned hot waste solids 56, e.g., a partially cooled solids batch 162 and a hot waste solids batch 158.

During warming of solids batch 160, valve 38 is in an open position, valve 50 is in a closed position, and valve 48 is in an open position. Heat exchanger 42 transfers heat from hot waste solids batch (directly transferred from thermal conditioning tank 54) to pre-warmed, solids batch 160. Once heat has been transferred from hot waste solids batch 158 to pre-warmed, solids batch 160, pre-warmed solids batch 160 becomes warmed solids batch 160, and hot waste solids batch 158 has been cooled to obtain partially cooled solids batch 162. Pump 36 in cooperation with pipe 34, valve 38 and pipe 40, pumps pre-warmed solids batch 160 from cold waste solids tank 20 through heat exchanger 42. Pre-warmed solids batch 160 is warmed, to become warmed batch 160, in heat exchanger 42 by heat transfer from hot solids batch 158. Warmed solids batch 160 then proceeds through tee 44 (valve 50 is now in a closed position), valve 48, and pipe 46 to return to cold waste solids tank 20. Several cycles through the heat exchanger are provided.

Concurrently, during warming of solids batch 160 (after transfer of hot waste solids batch 158 from thermal conditioning tank 54 to hot waste solids tank 64), valve 60 is in a closed position, valve 88 is in a closed position, and valve 238 is in an open position. Pump 82 in cooperation with pipe 84, tee 80 (valve 88 is in a closed position), valve 238 and pipe 68 transfer hot waste solids batch 158 from hot waste solids tank 64 through heat exchanger 42. Hot waste solids batch 158 cools and becomes partially cooled solids batch 162. Partially cooled solids batch 162 then proceeds through pipe 65 and returns to hot waste solids tank 64.

Fully, warmed solids batch 160 has increased in temperature through heat exchange in heat exchanger 42, valve 48 is closed and valve 38 remains in an open position. Pump 36 in cooperation with pipe 22, pipe 34, valve 38, pipe 40, heat exchanger 42, tee 44, valve 50 (which is now in an open position), and pipe 52, pumps the warmed (twice heated) solids batch 160 from tank 20 into thermal conditioning tank 54 and thus accomplishes the transfer of solids batch 160 to thermal conditioning tank 54. A subsequent cold waste solids batch 156 is pumped from tank 12 to become cold waste solids batch 154 in tank 20.

Partially cooled solids batch 162 transfers heat to cold waste solids batch 154 via heat exchanger 42 as described herein. Several exchanges through the heat exchanger are provided. Cold waste solids batch 154 becomes pre-warmed solids batch 160 and partially cooled solids batch 162 becomes fully cooled solids batch 162. Once the waste solids batch contained in tank 64 has transferred heat to a pre-warmed solids batch 160 (to obtain a warmed solids batch 160 which is transferred to thermal conditioning tank 54) and to a cold solids batch 154 (thus having most of its exchangeable heat exchanged with the solids waiting to enter thermal conditioning tank 54), valve 238 is closed (valve 60 is in a closed position), and valve 88 is opened.

Anaerobic digester 112 is connected to hot waste solids tank 64 by pipe 160', pump 82, pipe 84, valve 88 and pipe 110. Cooled solids batch 162 is transferred from hot waste solids tank 64 to anaerobic digester 112 in cooperation with pump 82, pipe 84, valve 88 and pipe 110. Once tank 64 is drained, valve 88 is closed and pump 82 is stopped and valve 60 is opened. A subsequent hot waste solids batch 158 flows (or is pumped by optional pump, not shown) into hot waste solids tank 64 through pipe 58 valve 60 pipe 62 from thermal conditioning tank 54. Once tank 64 is full, valve 60 is closed. It is appreciated that anaerobic digester 112 is located remotely from tanks, 20, 54 and 64. It is contemplated that anaerobic digester 112 can be geographically remote from tanks 20, 54 and 64.

It is appreciated that pre-warmed solids batch 160 and hot waste solids batch 158 can continuously circulate and recirculate through heat exchanger 42 several times. In a variant of the invention, the object of the recirculation is to obtain a temperature of solids batch 160 that is substantially equal to the temperature of partially cooled solids batch 162. The temperature of solids pre-warmed batch 160 and fully cooled solids batch 162 have substantially equalized through heat exchange in heat exchanger 42 in one variant of the invention of the normal mode of operation.

Figure 2:
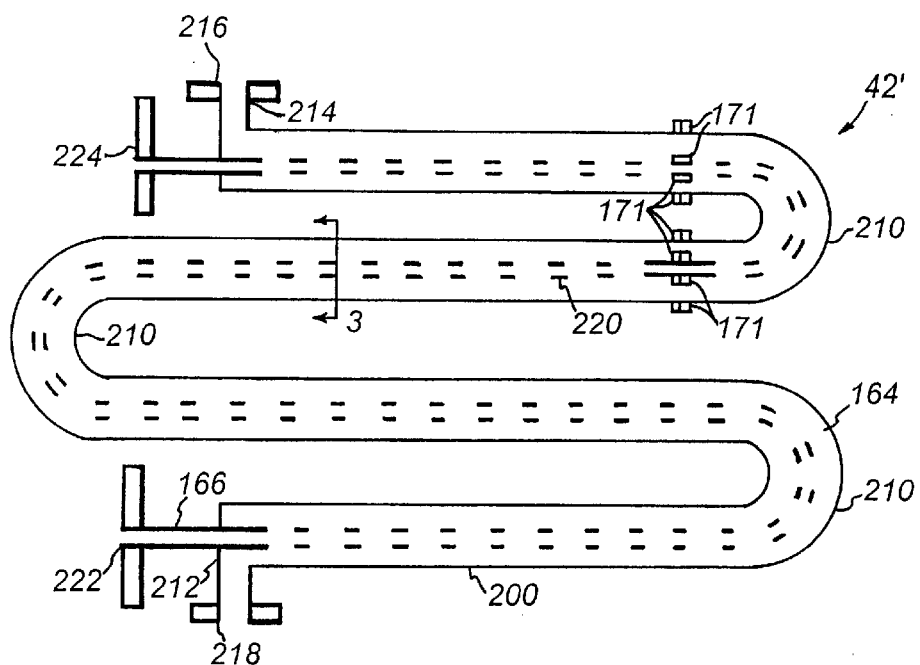
FIG. 2 is a side view of the heat exchanger illustrated in FIG. 1.

As illustrated in FIG. 2, preferably, heat exchanger 42 includes a removable tube-in-tube heat exchanger 42'. Tube-in-tube heat exchanger 42' has separate channels 164, 166. Channel 164 conducts new cold solids batch 154 or pre-warmed solids batch 160. Channel 166 conducts hot waste solids batch 158 or partially cooled solids batch 162 through heat exchanger 42' in one embodiment. In yet another embodiment thereof, channel 166 conducts new cold solids batch 154 and channel 164 conducts hot waste solids batch 158 through heat exchanger 42'. Heat exchanger 42' is readily removable from apparatus 10 since it is externalized from thermal conditioning tank 54, cold waste solids tank 20, and hot waste solids tank 64. Couplings 66 provide for ready detachment of heat exchanger 42, 42' from tee 44, pipe 65, pipe segment 68 and pipe 40.

It is appreciated that outer tube has a diameter in the range of about six to eight inches and inner tube has a diameter in the range of about three to about five inches. It is appreciated that the diameters of inner and outer tubes 200, 220 can be larger than those described or smaller than those described depending on the apparatus 10 that is used. The diameters of inner and outer tubes 200, 220 can be determined as per the needs of the system in generally.

Apparatus 10 also includes a control system (e.g., a computer and routines, or mechanical control) that provides for the continuous re-circulation of cold solids batch 154 or pre-warmed solids batch 160 through heat exchanger 42, 42'; and, conditioned hot waste solids batch 158 or pre-cooled and cooled solids batch 162 through separate channels 164, 166 in tube-in-tube heat exchanger 42' to increase transfer heat from hot waste solids batch 158 to pre-warmed solids batch 160, and, from pre-cooled solids batch 162 to cold solids batch 154. A portion of the control system also includes a routine or mechanical control for controlling the filling of thermal conditioning tank 54 with warmed solids batch 160 to no more than about ⅙th of thermal preconditioning tank's 54 total volume.

Thermal conditioning tank 54 is connected to heater 134 by egress pipe 152, pump 148, pipe 146, and return pipe 150. Heater 134 includes thermal conducting tube 144. After cold solids batch 154, new colds solids batch 156, and/or warmed solids batch 160 are fed into thermal conditioning tank 54, batch(es) 154, 156, 160 are warmed by heater 134 to a temperature of about 150° F. or other appropriate temperature to reduce pathogens in batch(es) 154, 156, 160. Batch (es) 154, 156, 160 are now considered conditioned hot waste solids 56. All of the solids (including cold solids batch 154, new cold solids batch 156, solids batch 160, and conditioned hot waste solids 56) in thermal conditioning tank 54 are transferred by way of pipe 152 to pump 148. Pump 148 pumps the solids through optional pipe 146, thermal conducting tube 144, and return pipe 150 back into thermal conditioning tank 54. It is appreciated that use of pump 148, pipes 152, 146, 150 and heater 134 that includes a heater/heat exchanger greatly increases the efficiency of thermally conditioning the solids in tank 54, greatly reduces the cost of manufacture of thermal conditioning tank 54, and greatly reduces the cost of maintenance of thermal conditioning tank 54. The interior of thermal conditioning tank 54 is free of mechanical agitation means that have problems associated therewith of poor mixing and high maintenance over time.

Heater 134 includes a heater/heat exchanger that is located externally of thermal conditioning tank 54 and separate therefrom. Pumping solids from thermal conditioning tank 54 keep the solids in thermal conditioning tank 54 mixed without the problems associated with conventional mechanical agitators that are disposed in the interior of thermal conditioning tanks. Preferably, heater 134 is controlled by the control system of apparatus 10 and includes means for continuously recirculating the solids in thermal conditioning tank 54 through heater 134 (combination heater/heat exchanger). In a variant, heater 134 is readily detachable from pipes 146, 150 and connector 141. Since heater 134 is externally located from thermal conditioning tank 54 and readily detachable from pipes 146, 150 it is appreciated that maintenance of both thermal conditioning tank 54 and heater 134 is facilitated and down time is reduced.

Heater 134 includes heating element or burner 140. Burner 140 heats water which circulates through water recirculator 136. Water recirculator 136 transfers heat from the water in the water recirculator 136 to thermal conducting tube 144 and the contents thereof. The solids in thermal conducting tube 144 are then heated to an effective temperature.

An effective temperature is generally in the range of about 148° F. to about 160° F. for waste having solids of about less than seven weight percent. Other effective temperatures are determined empirically. Effective periods of time are a function of the effective temperature selected. Exemplary temperatures and times are as follows: 148° F.—68.5 minutes; 150° F.—48.9 minutes; and, 160° F.—7.99 minutes. Effective time periods and temperatures are also selected to effect waste solubilization.

Burner 140 utilizes methane gas generated in anaerobic digester 112 and piped to burner 140 through pipe means 116, pipe 120, valve 122 and tee 124. Excess gas is released at vent 118. Burner 140 is also optionally powered by auxiliary gas source 130. Valve 126 may be in a closed position where burner 140 is powered by methane gas generated in anaerobic digester 112. Anaerobic digester 112 is connected to digested solids dewatering apparatus 114 or optionally disposed of in a conventional manner.

Auxiliary gas source 130 feeds methane gas (or other appropriate fuel) through pipe 128, valve 126 (valve 122 is in a closed position) to burner 140. It is appreciated that heat may also be directly passed from gas conducting, multiple bend tube 142 to water recirculator 136 to heat the water in water recirculator 136. Exhausts are vented from exhaust blower 168 at vent 138. Exhaust blower 168 aids in drawing in the digester gas or auxiliary fuel as well as air for combustion.

Pump 148 is used to continuously recirculate the solids in thermal conditioning tank 54 through heater 134 to keep the solids in thermal conditioning tank 54 thoroughly mixed. Thorough mixing of the solids in tank 54 insures that the solids are kept at a substantially uniform temperature throughout the tank. Keeping the solids at a substantially uniform temperature assists in reducing pathogens in the solids in thermal conditioning tank 54. It is also appreciated that it is not necessary to simultaneously maintain the viability of a microbiological population for solids degradation in thermal conditioning tank 54 during the thermal conditioning process, and as such no air or oxygen is provided to thermal conditioning tank 54. Optional pump (not shown), external to tank 54, is used to continuously recirculate the solids in the thermal conditioning tank 54 through optional conduit (not shown) thereby assuring that the contents of thermal conditioning tank 54 is well mixed.

Apparatus 10 enables a method of treating waste. The method of treating waste includes the steps of providing cold waste solids tank 20. Cold waste solids tank 20 is filled with one or more cold solids batch(es) 154 from storage tank 12 by way of pipe 14, pump 16 and pipe 18. Cold waste solids tank 20 has equal volume of hot waste solids tank 64. Upon start up of apparatus 10, valve 48 is in a closed position and valves 38 and 50 are in open positions. One or more cold solids batch(es) 154 are transferred from cold waste solids tank 20 to thermal conditioning tank 54.

In thermal conditioning tank 54, one or more cold solids batch(es) 154 are thermally conditioned at an effective thermal conditioning temperature and for an effective period of time to obtain conditioned hot waste solids 56. The heater 134 is activated for thermal conditioning of the one or more cold solids batch(es) 154, and the cold solids batch(es) 154 are heated to the effective thermal conditioning temperatures. An effective thermal conditioning temperature has been determined to be about 150° F. for an effective period of time. The effective period of time is about one hour. Other effective thermal conditioning temperature and time ranges are determined empirically.

The method of treating waste further includes the step of providing hot waste solids tank 64 which is remote from cold waste solids tank 20. Conditioned hot waste solids 56 are transferred in batch from thermal conditioning tank 54 to hot waste solids tank 64 to obtain conditioned hot waste solids batch 158 in hot waste solids tank 64. During transfer of conditioned hot waste solids 56 from thermal conditioning tank 54 to hot waste solids tank 64, valve 60 is in an open position. Conditioned hot waste solids can be transferred to hot waste solids tank 64 by gravity or by an optional pump (not shown). After transfer of hot waste solids batch 158 from thermal conditioning tank 54 to hot waste solids tank 64, valve 60 is closed.

After filling thermal conditioning tank 54 with one or more cold waste solids batch(es) 154, valve 50 is closed. In the normal mode of operation of apparatus 10, only one batch of solids enters the thermal conditioning tank 54. The volatile content of new cold solids batch 156 is optionally analyzed at this juncture.

Cold solids batch 154 has been pre-warmed by heat exchange with partially cooled waste solids batch 162 in heat exchanger 42 to obtain pre-warmed solids batch 160. The twice cooled hot waste solids batch 162 is discarded at this point and can be pumped to digester 112. A new hot waste solids batch 158 is transferred to hot waste solids tank 64 from thermal conditioning tank 54 (Valve 60 is opened. Tank 64 is filled. Valve 60 is closed.)

Valves 38 and 48 are now in an open position. Pre-warmed solids batch 160 is pumped from cold waste solids tank 20 through heat exchanger 42 by pump 36 in cooperation with related pipes 22, 34, 40, 46, tee 44, and valves 38 and 48 as described herein. Valves 50, 60 and 88 are in a closed position. Valve 238 is in an open position. At the same time as pre-warmed solids batch 160 is pumped through heat exchanger 42, pump 82 is activated and pump 82 pumps hot waste solids batch 158 from hot waste solids tank 64 through heat exchanger 42, by way of related pipes 160', 84, 80, 68, 65 and valve 238. Hot waste solids batch 158 transfers heat to pre-warmed solids batch 160 in heat exchanger 42 and hot waste solids batch 158 becomes once cooled solids batch 162. Pre-warmed solids batch 160 is warmed to become warmed solids batch 160 by this heat transfer. It is appreciated that the solids batches 160, 158 circulate through heat exchanger 42 until the temperatures of each of the respective batches roughly equalizes in one variant of the invention.

Valve 48 is now closed, and valves 50 and 38 are in an open position. Pump 36 pumps the warmed solids 160 from cold waste solids tank 20 to thermal conditioning tank 54 by way of pipe 22, pump 36, pipe 34, valve 38, pipe 40, connector 66, heat exchanger 42, connector 66, tee 44, valve 50 and conduit 52. This concludes one cycle.

After cold waste solids tank 20 has been drained of warmed solids batch 160, valve 50 is closed and valves 48 and 38 are opened. Pump 16 pumps a new cold waste solids batch 154 from tank 12 into cold waste solids tank 20. Pump 36 now begins to circulate new cold waste solids batch 154 through heat exchanger 42.

In a standard mode of operation of the method described herein, valve 60 and valve 88 are closed. Valve 238 is now in an opened position so that once cooled solids batch 162 can be further processed and cooled further. Once cooled solids batch 162 is pumped by pump 82 through heat exchanger 42 to heat new cold solids batch 154 to obtain pre-warmed solids batch 160.

Cooled solids batch 162 now has exchanged heat with two independent batches of solids that have been retained in cold waste solids tank 154. Cooled solids batch 162 undergoes at least two heat transferring drops in temperature. Cooled solids batch 162 is now ready to be processed in digester 112. Cooled solids batch 162 is pumped by pump 82 through tee 80 and through valve 88, which is in an open position, through optional pipe 110 into anaerobic digester 112. After cooled solids batch 162 is removed from hot waste solids tank 64, valve 60 is opened, valve 88 is closed, and a subsequent batch of conditioned hot waste solids 56 is fed into hot waste solids storage tank 64. Valve 38 is opened. Subsequent hot waste solids batch 158 transfers heat to pre-warmed solids batch 160 in heat exchanger 42 and hot waste solids batch 158 becomes initially cooled solids batch 162. Solids batch 160 further increases in temperature. It is appreciated that the solids batches 160, 158 continuously recirculate through heat exchanger 42 until the temperatures of each of the respective batches roughly equalizes in one variant of the invention.

The twice heated solids batch 160 is also now ready for discharge into thermal conditioning tank 54. Valve 48 is closed, and valves 50 and 38 are in an open position. Pump 36 pumps the twice heated solids batch 160 from cold waste solids tank 20 through pipe 34, valve 38, pipe 40, heat exchanger 42, tee 44, valve 50 and conduit 52 into thermal conditioning tank 54.

The method steps are now repeated again. An example of this method in practice is as follows:

EXAMPLE

Cold solids batch(es) 154 were transferred from cold waste solids tank 20 to thermal conditioning tank 54. Cold solids batch(es) 154 were heated to 150° F. to obtain conditioned hot waste solids 56. The conditioned hot waste solids 56 were transferred in batch to hot waste solids tank 64.

Cold waste solids tank 20 has solids batch 160 therein which has been pre-warmed by heat transfer in heat exchanger 42 with a partially cooled hot waste solids batch 162. Solids batch 160 increased in heat from about 40.0° F. to about 63.0° F. during pre-warming thereof. A new subsequent hot waste solids batch 158 was transferred from thermal conditioning tank 54 to hot waste solids tank 64. The new subsequent hot waste solids batch 158 was at about 150° F. Pump 36 was actuated for pumping pre-warmed solids batch 160 from cold waste solids tank 20 through heat exchanger 42. Pump 82 was simultaneously actuated to pump hot waste solids batch 158 (newly transferred from thermal conditioning tank 54 to hot waste solids tank 64) from hot waste solids tank 64 through heat exchanger 42. Solids batch 160 was heated from 63° F. to about 93° F. Hot waste solids batch 158 which was originally heated to 150° F. now drops in temperature to 123° F. and becomes once-cooled solids batch 162. The solids batch 160 is now fully warmed and transferred to thermal conditioning tank 54 from cold waste solids tank 20.

A new cold solids batch 154 was transferred to cold waste solids tank 20. Pump 36 was actuated for pumping solids batch 154 from cold waste solids tank 20 through heat exchanger 42. Pump 82 was simultaneously actuated to pump once, partially-cooled solids batch 162 (at 123° F.) from hot waste solids tank 64 through heat exchanger 42 and achieve twice cooled solids batch 162 at 97° F. Colds solids batch 154 is heated to about 63° F. to become pre-warmed solids batch 160. Hot waste solids batch 158 has had available heat transferred therefrom and it is discharged from hot waste solids tank 64 as cooled batch 162. That is, hot waste solids batch 158 has had available heat transferred from hot waste solids batch 158 to at least two solids batches 154, 160, and is discharged from hot waste solids tank 64.

The cycle of refilling the hot waste solids tank 64 with hot waste solids batch 158 is repeated, and the temperature of pre-warmed solids batch 160 is increased by heat transfer in heat exchanger 42. Hot solids tank 64 is filled with a subsequent conditioned hot waste solids batch 158 from thermal conditioning tank 54. Pumps 82 and 36 are again actuated. Solids batch 160 is further heated to a temperature of about 93° F. The further warmed solids batch 160 is discharged to thermal conditioning tank 54. Cold waste solids tank 20 is again filled with new cold solids batch 156, and the steps described above are repeated.

The method includes the step of anaerobically digesting fully cooled solids batch 162 in anaerobic digester 112 to obtain stabilized solids. The stabilized solids are then transferred to digested solids dewatering apparatus 114 for further processing thereof or optionally disposed of as is conventional. The step of anaerobically digesting further optionally includes a reduction in volatile matter in the stabilized solids of about 80 percent to about 40 percent. In a preferred embodiment, the step of anaerobically digesting includes a reduction in volatile matter in the stabilized solids of about 40 percent. It is appreciated that fully cooled solids batch 162 can be periodically discharged from heat exchanger 42 and hot waste solids tank 64 to anaerobic digester 112 as required. The volatile content of the stabilized solids can be optionally analyzed at this juncture.

In the practice of the methods described herein, heat exchanger 42 includes removable tube-in-tube heat exchanger 42' as illustrated in FIG. 2. It is appreciated that tube-in-tube heat exchanger 42' allows for efficient rates of solids 154, 158, 160, 162 flow through and heat exchange. The methods described herein utilize continuous re-circulation of new cold solids batch 156, solids batch 160, hot waste solids batch 158 and batch 162 through separate channels 164, 166 in tube-in-tube heat exchanger 42' to increase transfer heat from warm or hot waste solids to cold or cooler waste solids.

Heat exchanger 42' is made to be used with apparatus 10 for treating waste. Heat exchanger 42' includes continuous tube 200. Continuous tube 200 has one or more 180 degree bends 210, and first end portion 212 and second end portion 214. Waste solids entry port connector 216 and waste solids exit port connector 218 are located at either end portion 212, 214 of continuous tube 200. Waste solid entry and exit port connectors 216, 218 are removably connectable to waste solids re-circulating supply means that includes either tee 44, pipe 40, pipe 65 or pipe segment 68.

Inner tube 220 is disposed inside continuous tube 200. Preferably, inner tube 220 is concentric with continuous tube 200. Inner tube 220 has inner tube entry port connector 222 and inner tube exit port connector 224 which are both accessible from the exterior of heat exchanger 42'. Port connectors 222, 224 allow for heat exchanger 42' to removably connect inner tube entry port connector 222 and inner tube exit port connector 224 to the waste solids re-circulating supply means described above. Inner tube 220 has a continuous tube wall which transfers heat between warmer waste solids 158, 162 and cooler waste solids 154, 160 when the solids continuously re-circulate through tubes 200, 220.

It is appreciated that inner tube 220 and outer tube 200 are constructed and sized to provide for unequal flow rates through each respective tube. The respective pumps are actuated to provide these unequal flow rates. Tube 220 is of a smaller diameter than tube 200. In a preferred embodiment, the diameter of tube 200 is about six (6) inches and the diameter of tube 220 is three (3) inches. In a variant, the diameter of tube 200 is about eight (8) inches and the diameter 220 is about five (5) inches.

The flow rates through tube 200 where the diameter of tube 200 is about six (6) inches are in the range of about 220 gallons per minute (gpm) to about 270 gpm hot or partially cooled solids. The flow rates through tube 220 where the diameter of tube 220 is about three (3) inches are in the range of about 70 gpm to about 120 gpm cold or partially warmed solids. In yet another variant, the flow rates through tube 200 where the diameter of tube 200 is about six (6) inches are about 240 gallons per minute (gpm) hot or partially cooled solids. The flow rates through tube 220 where the diameter of tube 220 is about three (3) inches are about 90 gpm cold or partially warmed solids.

The flow rates through tube 200 where the diameter of tube 200 is about eight (8) inches are in the range of about 300 gallons per minute (gpm) to about 350 gpm hot or partially cooled solids. The flow rates through tube 220 where the diameter of tube 220 is about five (5) inches are in the range of about 230 gpm to about 280 gpm cold or partially warmed solids. In yet another variant, the flow rates through tube 200 where the diameter of tube 200 is about eight (8) inches are about 320 gallons per minute (gpm) hot or partially cooled solids. The flow rates through tube 220 where the diameter of tube 220 is about five (5) inches are about 250 gpm cold or partially warmed solids. Tubes 200, 220 are generally constructed from carbon steel or stainless steel. Other suitable materials may also be employed. The unequal flow of solids through tubes 200, 220 is accommodated by re-circulation from and to each respective cold and hot waste solids tanks.

In one variant, it is further appreciated that bends 210 are generally cast from a metal and have bend connectors 171 connecting each respective bend 180 to the linear portion of each individual tubes 200, 220. Connectors 171 allow bends 210 to be removably connected to the linear portions of tubes 200, 220 to facilitate servicing of a respective tube. Bends 210 are bolted to or secured by other means to heat exchanger 42' at connectors 171 to provide for ease of removal of a respective bend 210 for servicing of the interior of the tube 200, 220. One or more bends 210 may have connectors 171. It is appreciated that connectors 66 connecting tube 220 of heat exchanger 42' to the rest of apparatus 10 can be disconnected from the rest of apparatus 10 and serviced without interrupting or interfering with the flow of solids though tube 200. Similarly, connectors 66 can be disconnected so that tube 220 can be serviced without interrupting the flow of solids through tube 200. Servicing of tubes 200, 220 can be accomplished by rodding each respective tube.

In one variant of heat exchanger 42', continuous tube 200 is dimensioned and constructed to conduct hot waste solids through continuous tube 200, and inner tube 220 is dimensioned and constructed to conduct cold waste solids through inner tube 220. In a second variant of heat exchanger 42', continuous tube 200 is dimensioned and constructed to conduct cold waste solids through continuous tube 200, and inner tube 220 is dimensioned and constructed to conduct hot waste solids through inner tube 220. It is understood that continuous tube 200 and inner tube 220 are dimensioned to conduct hot waste solids through continuous tube 200 at a rate at which there is efficient transfer of heat from hot or warmer waste solids 158, 162 to cold or cooler waste solids 156, 160 to effect thermal pre-conditioning of cold or cooler waste solids 156, 160.

In the embodiment of FIG. 2, heat exchanger 42' includes continuous tube 200 that has at least three 180 degree bends 210. More bends 210 are provided as desired. Continuous tube 200 can also have an optional insulating jacket (not shown) surrounding continuous tube 200.

In general, the first stage of apparatus 10 generally includes low-temperature thermal conditioning without biological activity. The low temperature thermal conditioning takes place in thermal conditioning tank 54 with the assistance of heater 134. It is appreciated that no air or oxygen is added to thermal conditioning tank 54 or heater 134. Consequently, there are no odor control problems with this stage of the process.

The second stage of the process includes transfer of processed waste solids as described above to anaerobic digester 112 for solid stabilization. Solids that are waiting to enter the first stage of apparatus 10 have heat transferred thereto by the heat recovery system as described above that transfers heat between the hot, treated solids in the first stage and the cold, untreated solids waiting to enter the first stage. This apparatus transfers heat between the hot and cold solids with no intermediate transfer medium, such as water, between the heat exchange tubes as described above.

The first stage of the apparatus 10 requires no biological activity. The thermal conditioning at temperatures and for periods of time that are determined empirically in the first stage results in pathogen reduction as well as solubilization of solids. Temperatures and times are selected so as to obtain pathogen reduction without biological digestion. Hence, it is appreciated that the first stage of the apparatus 10 is greatly simplified and requires less user attention. The user need not monitor the process of the first stage or generally make operating adjustments to apparatus 10 to maintain the viability of a microbiological population for solids degradation. Generally, it is preferred that the operating temperature of the first stage be maintained at about 150° F. for about 1 hour. The time and temperature requirements generally are dictated by those requirements necessary for pathogen reduction to meet Class A biosolids in U.S. government 503 regulations.

Once pathogens have been reduced to meet Class A criteria, the preconditioned, solubilized solids are stabilized in anaerobic digester 112. Anaerobic digester 112 involves a two step process. Stabilization is generally defined as an overall reduction of volatile matter in the solids of about 38 percent. This level of stabilization meets the criteria for Class A biosolids as specified in Option 1 of U.S. government 503 regulations. As described above, methane gas generated in the second stage is used to maintain the operating temperature of stage one. Hence, an optional outside fuel source is generally not required. Therefore, with respect to operating temperature, the process is autothermal.

A preferred batch size as described herein is about ⅙th or less than ⅙th the volume of thermal conditioning tank 54. The initial analysis of the volatile content is taken on the feed to stage one of the process and the final analysis for volatile content is taken on the discharge from stage two of the process. It is appreciated that this process provides low temperature thermal conditioning followed by anaerobic digestion. Low temperature thermal conditioning with heat recovery allows the process to be autothermal.

It is also appreciated that tube-in-tube heat exchanger 42' provides for heat recovery for solids in a multiple return, bend, tube-in-tube heat exchanger. Tube-in-tube heat exchanger transfers heat between hot, treated solids and cold, untreated solids in the first stage with no intermediate heat transfer medium. It is also appreciated that the method described herein provides for alternating heat transfer between new cold solids batch 156, solids batch 160, and/or one or more solids batch(es) 158, 162 as described herein.

FIG. 4 illustrates tables 1–4 related to the process of thermal conditioning for pathogen reduction and solids solubilization. Thermal conditioning reduces pathogens in the solids prior to digestion. Death curves are available showing the effect of time and temperature on the destruction of pathogens (Feachem and Others, 1980). These curves show that pathogen destruction requires less time with increased process temperature. The EPA (Environmental Protection Agency) developed the equation given in Alternative 1 of the 503 Regulation to determine acceptable time and temperature relationships. A temperature of 150° F. requires about an hour detention to achieve sufficient pathogen reduction as required for the Class A standard.

The one hour detention time allows for a small thermal conditioning tank 54. Furthermore, the one hour detention makes batch feed feasible. The benefit of batch feed is the assurance that pathogen levels will not be exceeded due to short circuiting. (In comparison, a 130° F. temperature would require over 28 hours to achieve Class A pathogen reduction making batch feed less attractive.)

Table 1 shows the results of four bench scale tests of thermal conditioning. The bench scale tests consisted of heating biosolids mixtures of $\frac{2}{3}$ primary sludge and $\frac{1}{3}$ waste activated sludge (v/v) to 150° F. for one hour in a 2 liter beaker. The beaker was covered with plexiglass; and a mixer shaft extended through a hole in the plexiglass to an impeller submerged in the biosolids to keep them well mixed. A $CO_2$ blanket was created by constantly bleeding regulated $CO_2$ through another hole in the plexiglass.

All four tests resulted in pathogen reduction below the Class A fecal coliform requirement of 1,000 MPN per dry gram. Influent fecal coliform averaged 11.9 million MPN per dry gram. Thermal conditioning reduced the fecal coliform to an average value of 675 MPN per dry gram. The total solids varied from 2.15 percent to 4.91 percent for these tests.

Another advantage of the thermal conditioning is the solubilization and breaking down of the solids, as shown in Table 2 of FIG. 4. Total dissolved solids (TDS), total kjedhal nitrogen (TKN) and chemical oxygen demand (COD) were parameters analyzed during the testing and reflect solids solubilization. Influent soluble COD averaged 4,230 mg/l. The average soluble COD increased to 12,200 mg/l after thermal conditioning. Prior to thermal conditioning, the soluble TKN average 280 mg/l and rose to an average soluble TKN of 1,040 mg/l after thermal conditioning. Influent TDS averaged 2,630 mg/l and increased to an average value of 7,020 mg/l after thermal conditioning.

A typical weight percent nitrogen in cell mass is 12.4 percent (Tchobanoglous and Burton, 1991, page 365). With soluble ammonia constant in the influent and effluent, the increase in soluble TKN indicates cell membranes were broken down. The ratio of the increase in soluble TKN to the increase in soluble COD ($\Delta TKN/\Delta COD \times 100$) ranged from 8.8 percent to 10.3 percent. Table 3 of FIG. 4 summarizes these results.

Figure 3:
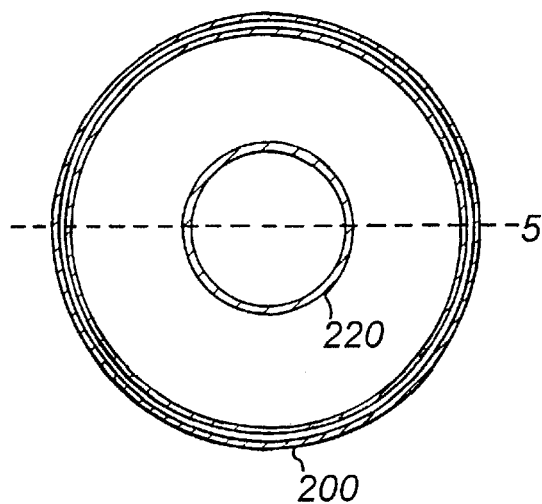
FIG. 3 is a cross-sectional view of the heat exchanger of FIG. 2.
Figure 5:
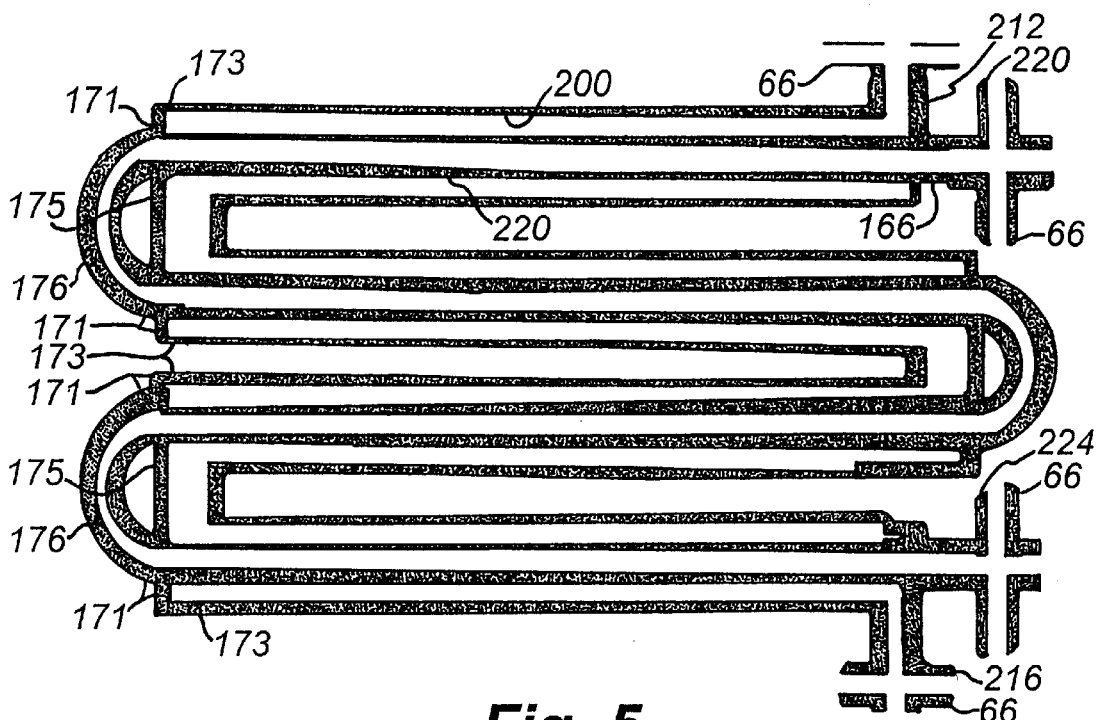
FIG. 5 is a cross sectional view of heat exchanger 42' as illustrated in FIG. 2 along phantom line 5 shown in FIG. 3.

FIG. 5 illustrates a cross sectional view of a variant of heat exchanger 42' illustrated in FIG. 2 along phantom line 5 of FIG. 3. Outer tube 200 has a set of 90 degree corner portions 173 having a substantially flat walls 175. Removable semi-circular ends 176 are connected to walls 175 with connectors 171 which may be bolts or other types of fasteners. Removal of ends 176 allows for the cleaning of inner tube 220 without interfering with the continuous flow of solids through tube 200 thereby facilitating maintenance of the heat exchanger 42'.

HEAT RECOVERY EXAMPLE

Heat recovery allows for economical pathogen reduction by thermal treatment. The heat recovery system (portion) of apparatus 10 utilizes tube-in-tube heat exchanger 42, 42'. The process can be divided into six (6) steps which form the operational sequence of the heat recovery system. The addition and withdrawal of biosolids from the hot waste solids tank 64 and cold waste solids tank 20 is staggered and forms a two step heat recovery system which minimizes the required area of the heat exchanger. Two batches of hot, thermally treated waste solids heat a single batch of untreated waste solids. Conversely, two batches of cold, unconditioned waste solids cool a treated batch of biosolids. Furthermore, the batch operation of the heat recovery assures that the time and temperature requirement has been met for pathogen reduction.

Table 4 of FIG. 4 summarizes the benefits of heat recovery. The table has a convective heat loss based on a 60' diameter digester with 22' side wall depth, an ambient air temperature of −10° F. and a influent feed solids temperature and flow rate of 40° F. and 40,000 gallons per day, respectively. Also, the following U-values, in $Btu/hrft^{2o}$ F., were assumed: 0.22 for the cover, 0.27 for the side wall and 0.11 for the floor.

Table 4 of FIG. 4 also summarizes the heat balance associated with implementing thermal conditioning at 150° F. with heat recovery. An assumption is negligible heat loss from the well insulated 14' diameter by 16° tall thermal conditioning tank 54. The heat associated with raising the solids to 150° F. is recovered thereby maintaining the heat requirement with respect to 95° F.

Heat Recovery: Step 1

Thickened, unconditional biosolids 156 are pumped into cold waste solids tank 20.

Heat Recovery: Step 2

Next, the hot waste solids pump 82 and cold waste solids pump 36 are turned on. Hot solids, partially cooled and at approximately 123° F., are pumped through the outer tube 200 of heat exchanger 42, or 42'. Simultaneously, cold solids initially at 40° F. are pumped through inner tube 220 of heat exchanger 42, or 42'. The hot and cold waste solids are recirculated for a time period necessary to transfer a sufficient amount of heat and reach present temperature set points for the cold waste solids tank 20 and hot waste solids tank 64.

Heat Recovery: Step 3

Step 3 begins once the cold solids have been warmed to 63° F. and the hot solids have been cooled to a final temperature of 97° F. Heat losses through the walls and cover of anaerobic digester 112 will be accounted for by the hot solids entering digester 112 at a temperature above the normal operating temperature. As heat losses in digester 112 increase, due to colder air temperatures, the temperature of the thermally conditioned solids to digester 112 will also be increased. Step 3 is comprised of the cooled and thermally conditioned solids being pumped into anaerobic digester 112 over a 5 minute time period.

Heat Recovery: Step 4

Hot waste solids tank 64 is filled with thermally conditioned solids at 150° F.

Heat Recovery: Step 5

Next, in Step 5, the hot waste solids pump 82 and cold waste solids pump 36 are again turned on. Hot solids at 150°

F., are pumped through outer tube 200 of heat exchanger 42, or 42'. Simultaneously, cold solids now at 63° F. are pumped through inner tube 220 of heat exchanger 42, or 42'. Heat transfer requires approximately 5 minutes; warming the cold solids to 93° F. and cooling the hot solids to 123° F.

Heat Recovery: Step 6

The warmed and untreated solids are pumped into the thermal conditioning tank 54 over a 5 minute time period.

Heat Recovery: Repeat Steps

Finally, the process for thermal conditioning is repeated beginning with Step 1. Cold, untreated solids are pumped into cold waste solids tank 20.

The overall process is thermal conditioning followed by anaerobic digestion in digester 112. The addition of tank for thermal conditioning 54 and heat exchanger 42 constitute the main components to retrofit an existing anaerobic digestion system into one capable of producing Class A Biosolids.

It is also contemplated that the above discussed apparatus 10 could be run in a continuous mode rather than in a batch mode. Referring to FIG. 1, in the contemplated continuous mode of operation, cold solid waste would be continuously circulated from the cold solid waste tank 20 through the heat exchanger 42, and hot solid waste would be continuously circulated from the hot waste solids tank 64 through the heat exchanger 42. Valve 50 would be left open or partially open such that a fraction of the cold waste solids being circulated through the heat exchanger 42 would be continuously fed to the thermal conditioning tank 54, with the remainder returning to the cold waste solids tank 20. Valve 60 would also be left open or partially open such that a fraction of the waste solids in the thermal conditioning tank 54 would be continuously fed into the hot waste solids tank 64. Valve 88 would be left open or partially open such that a fraction of the hot waste solids being recirculated through the heat exchanger 42 would be continuously fed to the anaerobic digester 112, with the remainder returning to the hot waste solids tank 64. The cold waste solids tank 20 may be continuously supplied with new cold waste solids from storage tank 12 as necessary.

It would be preferred that the flow rate of waste solids entering the thermal conditioning tank 54, the flow rate of waste solids leaving the thermal conditioning tank 54, and flow rate of waste solids entering the anaerobic digester 112 would be substantially the same.

Figure 6:
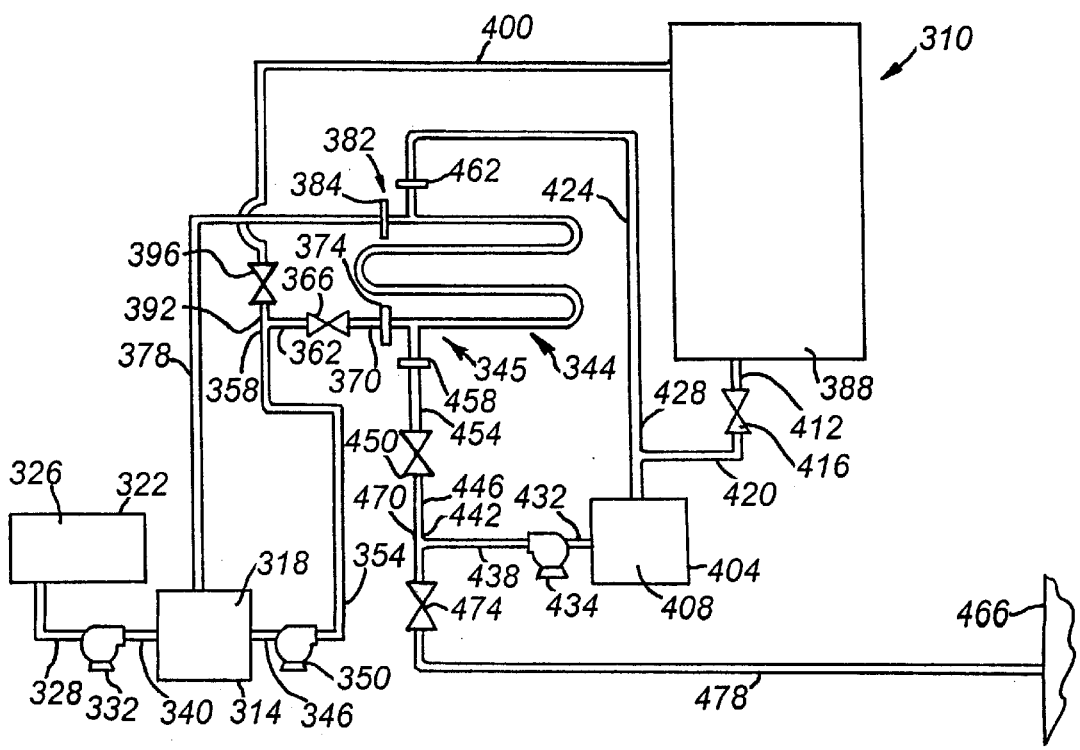
FIG. 6 is a schematic view of a second embodiment of an apparatus for treating waste of the present invention.

FIG. 6 is a schematic view of a second embodiment of the invention including an apparatus 310 for treating waste. In this embodiment, sludge or waste solids are being treated in a two stage treatment process. The first stage is a thermophilic digestion step, and the second stage is a mesophilic digestion step. The thermophilic step may be aerobic or anaerobic.

Thermophilic digestion generally occurs at a greater temperature than mesophilic digestion. If solid waste enters the mesophilic digestion step at thermophilic temperatures, the mesophilic digestion will likely be disrupted. Therefore, it is necessary that the heat energy imparted into the solid waste in the thermophilic digestion step be taken out of the solid waste prior to entering the mesophilic step. Additionally, it is desirable to recover this heat energy by transferring the heat energy in the solid waste leaving the thermophilic digestion step to sludge entering the thermophilic digestion step.

The apparatus 310 of this embodiment is very similar to the first embodiment as discussed above, with small variations. Apparatus 310 includes cold waste solids tank 314 for retaining cold waste solids 318, and a thickener or storage tank 322 for retaining thickened solid waste 326. Tank 322 is in communication with tank 314 through conduit 328 which is connected to pump 332 which is connected to conduit 340. Cold waste solids tank 314 is in communication with a first end 345 of heat exchanger 344 through conduit 346 which is connected to pump 350 which is connected to conduit 354 which splits at y-joint 358. The first side 362 of y-joint 358 is connected to valve 366 which is connected to conduit 370 which is connected to the first end 345 of the heat exchanger 344 at coupling 374.

The tank 314 is also in communication with a second end 382 of heat exchanger 344 through conduit 378 which is connected to the second end 382 of the heat exchanger 344 at coupling 384.

The heat exchanger 344 is a tube-in-tube heat exchanger. Preferably, the heat exchanger is a tube-in-tube heat exchanger as discussed above in relation to the first embodiment. Additionally, it is preferred that the cold waste solids tank 314 is in communication with the inner tube of the heat exchanger 344.

The cold waste solids tank 314 is also in communication with a first conditioning vessel 388 through second side 392 of y-joint 358 which is connected to valve 396 which is connected to conduit 400 which is connected to the conditioning vessel 388. The conditioning vessel 388 is an appropriate conditioning vessel for use in thermophilic digestion of solid waste as known in the art.

The apparatus 310 also includes a hot waste solids tank 404 for retaining hot waste solids 408. The conditioning vessel 388 is in communication with the tank 404 through conduit 412, which is connected to valve 416 which is connected to conduit 420 which joins with conduit 424 at y-joint 428. Conduit 424 is then connected to tank 404.

Hot waste solids tank 404 is in communication with the first end 345 of heat exchanger 344 through conduit 432 which is connected to pump 434 which is connected to conduit 438 which splits at y-joint 442. The first side 446 of y-joint 442 is connected to valve 450 which is connected to conduit 454 which is connected to the first end 345 of the heat exchanger 344 at coupling 458. The tank 404 is also in communication with the second end 382 of heat exchanger 344 through conduit 424 which is connected to the second end 382 of the heat exchanger 344 at coupling 462. It is preferred that the hot waste solids tank 404 is in communication with the outer tube of the heat exchanger 344.

The hot waste solids tank 404 is also in communication with a second conditioning vessel 466 (partially shown) through second side 470 of y-joint 442 which is connected to valve 474 which is connected to conduit 478 which is connected to conditioning vessel 466. The conditioning vessel 466 in an appropriate conditioning vessel for use in mesophilic digestion of solids waste as known in the art.

In the embodiment shown, the conditioning vessels 388 and 466 are appropriate conditioning vessels for use in thermophilic and mesophilic conditioning processes, respectively. However, it should be understood that when other treatment processes are used, the conditioning vessels used will be the appropriate type of vessel for the process being used.

The treatment apparatus 310 can be run in either a batch mode process, or a continuous mode process.

The batch process may be run substantially similar to the batch mode of operation as discussed above with regard to the first embodiment, but using thermophilic and mesophilic digestion techniques and time periods as appropriate and as generally known in the art. The heat transfer between the hot waste solids and the cold waste solids may also be substantially the same as the process discussed above in the first embodiment.

The batch mode preferably proceeds generally as given in the Heat Recovery Example as discussed above in the first embodiment of the invention, but with the apparatus, including the thermophilic and mesophilic digestion vessels, as disclosed in the current embodiment. Generally, the cold, undigested solids, prior to being fed into the digester, are pre-warmed in batch mode by circulating them through the tube-in-tube heat exchanger 344 and back into the cold waste solids tank at similar flow rates as discussed above in the first embodiment. The hot solids are cooled by recirculating them from the hot waste solids tank 404 through the heat exchanger 344 and back to the hot waste solids tank 404 at similar flow rates as discussed above in the first embodiment. The cooled hot waste solids are then transferred in batch to the mesophilic digester 466. A new hot waste solids batch is transferred in batch from the thermophilic digestion vessel 388 to the hot waste solids tank 404. The warmed cold waste solids are transferred in batch from the cold waste solids tank 314 to the thermophilic digestion vessel 388.

As seen above in the first embodiment, the addition and withdrawal of waste solids from the hot waste solids tank 404, the cold waste solids tank 314, and the thermophilic digestion vessel 388 is preferably staggered and forms a two step heat recovery system. Two batches of hot waste solids heat a single batch of untreated waste solids. Conversely, two batches of cold waste solids cool one treated batch of hot solids. It should be understood, however, that the current invention is not limited to this preferred staggered batch process, and that other batch processes are contemplated. For example, it is contemplated that only one cold waste batch would cool every one hot waste batch, and conversely that only one hot waste batch would warm every one cold waste batch.

It is also contemplated that the above discussed apparatus 310 could be run in a continuous mode rather than in a batch mode. Referring to FIG. 6, in a contemplated continuous mode of operation, cold solid waste would be continuously circulated from the cold solid waste tank 314 through the heat exchanger 344, and hot solid waste would be continuously circulated from the hot solid waste tank 404 through the heat exchanger 344. Valve 396 would be left open or partially open during the recirculation of waste through the heat exchanger 344 such that a fraction of the cold waste solids being recirculated through the heat exchanger 344 would be continuously fed to the thermophilic digestion vessel 388, with the remainder returning to the cold waste solids tank 314. Valve 416 would also be left open or partially open during recirculation such that a fraction of the waste solids in the thermophilic vessel 388 would be continuously fed into the hot waste solids tank 404. Valve 474 would be left open or partially open such that a fraction of the hot waste solids being recirculated through the heat exchanger 344 would be continuously fed to the mesophilic digestion vessel 466, with the remainder returning to the hot waste solids tank 404. The cold waste solids tank 314 may be continuously supplied with new cold waste solids from storage tank 322 as necessary.

It would be preferred that the flow rate of waste solids entering the thermophilic digestion vessel 388, the flow rate of waste solids leaving thermophilic digestion vessel 388, and flow rate of waste solids entering the mesophilic digestion vessel 466 would be substantially the same.

Referring to FIG. 6, in a preferred continuous process, pump 332 pumps thickened solids from tank 322 at a rate of about 30 Gallons Per Minute (GPM) into tank 314. Pump 350 pumps cold waste solids from tank 314 at a rate of about 250 GPM, through conduit 354. Valves 366 and 396 are open such that about 220 GPM flows through valve 366 and circulates through the heat exchanger 344, into conduit 378, and back to tank 314. About 30 GPM of the pumped cold waste solids flows through valve 396 and into vessel 388 through conduit 400. Valve 416 is open such that about 30 GPM of thermophilically digested solids from vessel 388 move through valve 416, and into tank 404. Pump 434 pumps hot waste solids from tank 404 at a rate of about 320 GPM through conduit 438. Valves 450 and 474 are open such that about 290 GPM flows through valve 450 and circulates through the heat exchanger 344, into conduit 424, and back to tank 404. About 30 GPM of the pumped hot waste solids flows through valve 474 and into vessel 466 through conduit 478.

It should be understood that the invention is not limited to the flow rates given in the above preferred continuous method. Other flow rates are contemplated and may be used depending upon the size of the apparatus, the type of treatment process used, the desired quality of treatment, and other variables in the system as would be generally recognized by those skilled in the art.

Generally, it is preferred that the flow rates through pump 434 where the diameter of the outer tube of the heat exchanger is about eight (8) inches are in the range of about 300 gpm to about 350 gpm. The flow rates through pump 350 where the diameter of the inner tube of the heat exchanger is about five (5) inches are in the range of about 230 gpm to about 280 gpm. The flow rate of solids through valves 396, 416, and 474 is preferably between about 1 and about 25% of the flow rate of the flow rate through pump 350. It should be understood, however, that flow rates through valves 396, 416, and 474 may approach 100% of the flow rate through pump 350, depending upon the desired amount of heat transfer and digestion.

Although only a few embodiments of the invention have been described, it should be understood that the heat recovery apparatus and process may be used in other sludge treatment and digestion processes where there is a temperature difference between sludge at different stages in a treatment process. For example, combinations of staged temperature processes that may employ the heat recovery apparatus and process include, but are not limited to: a anaerobic thermophilic step followed by an anaerobic mesophilic step; an aerobic thermophilic step followed by an anaerobic mesophilic step, or any combination of these or other process steps wherein there is a temperature gradient between stages that would benefit from heat recovery.

Additionally, those of ordinary skill in the art will recognize that the embodiment described above may be modified and altered without departing from the central spirit and scope of the invention. Thus, the embodiments described above are to be considered in all respects as illustrative and not restrictive, the scope of the invention being indicated by the claims, rather than by the foregoing description, and all changes which come within the meaning and range of equivalency of the claims are intended to be embraced herein.

I claim:

1. A method of treating waste, the method comprising the acts of:

(a) providing a cold waste solids source for maintaining cold waste solids, a hot waste solids source separate from the cold waste solids source for maintaining hot waste solids, and a heat exchanger remotely located from and fluidly interconnected with the cold waste solids source and the hot waste solids source;

(b) passing a volume of cold waste solids from the cold waste solids source through the heat exchanger;

(c) passing a volume of hot waste solids from the hot waste solids source through the heat exchanger to transfer heat from the hot waste solids to the cold waste solids; and (d) passing at least a second time through the heat exchanger at least a portion of one of the volume of cold waste solids and the volume of hot waste solids passed through the heat exchanger to transfer heat from the hot waste solids passing through the heat exchanger to the cold waste solids passing through the heat exchanger.

2. The method of claim 1, further comprising before act (d), the act of:

(e) returning at least a portion of one of the volume of cold waste solids and the volume of hot waste solids passed through the heat exchanger to one of the cold waste solids source and the hot waste solids source.

3. The method of claim 1, wherein act (d) includes passing the volume of hot waste solids through the heat exchanger at least twice and passing the volume of cold waste solids through the heat exchanger at least twice.

4. The method of claim 1, further including the acts of:

(f) providing a conditioning vessel remote from and fluidly interconnected with the cold waste solids source and the hot waste solids source;

(g) passing a second volume of the cold waste solids from the cold waste solids source to the conditioning vessel;

(h) conditioning the second volume of cold waste solids in the conditioning vessel to produce hot waste solids;

(i) passing hot waste solids from the conditioning vessel to the hot waste solids source; and (j) passing a second volume of the hot waste solids from the hot waste solids source to a receiving vessel.

5. The method of claim 4, wherein acts (b), (c), (g), (h), (i), and (j) are continuously performed.

6. The method of claim 4, wherein, in act (b), the passing of the volume of cold waste solids occurs at a first flow rate, and wherein, in act, (g) the passing of the second volume of cold waste solids occurs at a second flow rate that is slower than the first flow rate.

7. The method of claim 4, wherein, in act (c), the passing of the volume of hot waste solids occurs at a first flow rate, and wherein, in act (j), the passing of the second volume of hot waste solids occurs at a second flow rate that is slower than the first flow rate.

8. The method of claim 1, wherein act (b) and act (c) are performed continuously.

9. The method of claim 1, wherein the heat exchanger includes:

an outer tube disposed in fluid communication with one of the cold waste solids source and the hot waste solids source such that solids from the one of said cold waste solids source and the hot waste solids source can move through the outer tube;

an inner tube inside the outer tube, the inner tube being in fluid communication with an other of the cold waste solids source and the hot waste solids source such that solids from the other of the cold waste solids source and the hot waste solids source can move through the inner tube, the inner tube having a thermally-conductive tube wall for transferring heat between the inner tube and outer tube.

10. The method of claim 1, wherein act (b) includes recirculating the volume of the cold waste solids from the cold waste solids source through the heat exchanger and back to the cold waste solids source, and wherein act (c) includes recirculating the volume of the hot waste solids from the hot waste solids source through the heat exchanger and back to the hot waste solids source.

11. The method of claim 10, wherein the recirculating of the cold waste solids occurs at a first flow rate, and wherein the recirculating of the hot waste solids occurs at a second flow rate different from the first flow rate.

12. The method of claim 1, wherein the act of providing a heat exchanger includes providing a tube-in-tube heat exchanger having an inner tube and an outer tube;

wherein act (b) includes passing a volume of cold waste solids through one of the outer tube and the inner tube; and wherein act (c) includes passing a volume of hot waste solids through the other of the outer tube and the inner tube.

13. A method of treating waste, comprising the act of:

(a) providing a cold waste solids source for maintaining cold waste solids, a hot waste solids source separate from the cold waste solids source, for maintaining hot waste solids, a conditioning vessel remote from and fluidly interconnected with the cold waste solids source and the hot waste solids source for conditioning cold waste solids to produce hot waste solids, and a heat exchanger remotely located from and fluidly interconnected with the cold waste solids source and the hot waste solids source;

(b) continuously passing a volume of cold waste solids from the cold waste solids tank through the heat exchanger;

(c) continuously passing a volume of hot waste solids from the hot waste solids tank through the heat exchanger to transfer heat from the hot waste solids passing through the heat exchanger to the cold waste solids passing through the heat exchanger;

(d) passing a second volume of cold waste solids from the cold waste solids tank to the conditioning tank;

(e) conditioning the second volume of cold waste solids in the conditioning vessel to produce hot waste solids;

(f) passing a second volume of hot waste solids from the conditioning vessel to the hot waste solids source; and (g) moving a third volume of hot waste solids from the hot waste solids tank to a receiving tank.

14. The method of claim 13, wherein the heat exchanger includes an outer tube disposed in fluid communication with one of the cold waste solids source and the hot waste solids source such that waste solids from the one of said cold waste solids source and the hot waste solids source are passable through the outer tube and an inner tube disposed in fluid communication with an other of the cold waste solids source and the hot waste solids source such that waste solids from the other of the cold waste solids source and the hot waste solids source are passable through the inner tube, the inner tube having a tube wall for transferring heat between hot waste solids passing through the heat exchanger and cold waste solids passing through the heat exchanger.

15. The method of claim 14, wherein the acts (d), (e), (f), and (g) are performed continuously.

16. The method of claim 13, wherein act (b) includes recirculating the volume of cold waste solids from the cold waste solids source through the heat exchanger and back to the cold waste solids source and wherein act (c) includes recirculating the volume of the hot waste solids from the hot waste solids source through the heat exchanger and back to the hot waste solids source.

17. The method of claim 16, wherein the recirculating of cold waste solids occurs at a first flow rate, and wherein the recirculating of hot waste solids occurs at a second flow rate different from the first flow rate.

18. A method of treating waste, comprising the acts of:
(a) providing a cold waste solids source for maintaining cold waste solids, a hot waste solids source separate from the cold waste solids source, for maintaining hot waste solids, and a heat exchanger remotely located from and connected to the cold waste solids source and the hot waste solids source;
(b) passing cold waste solids from the cold waste solids source through the heat exchanger and back to the cold waste solids source; and
(c) passing hot waste solids from said hot waste solids source through the heat exchanger back to the hot waste solids source, whereby heat is transferred from the hot waste solids passing through the heat exchanger to the cold waste solids passing through the heat exchanger.

19. The method of claim 18, wherein acts (b) and (c) are performed on a continuous basis.

20. The method of claim 18, further including the acts of:
(d) providing a conditioning vessel remote from and connected to the cold waste solids source and the hot waste solids source;
(e) discharging a volume of cold waste solids from the cold waste solids source to said conditioning vessel;
(f) conditioning the volume of cold waste solids in the conditioning vessel to produce hot waste solids;
(g) discharging a volume of hot waste solids from the conditioning vessel to the hot waste solids source; and
(h) discharging a second volume of hot waste solids from the hot waste solids source to a receiving vessel.

21. The method of claim 20, wherein acts (b), (c), (e), (f), (g), and (h) are continuously performed.

22. The method of claim 18, wherein one of acts (b) and (c) further includes passing one of the cold waste solids and the hot waste solids through the heat exchanger at least twice.

23. The method of claim 18, wherein the act (a) includes providing a tube-in-tube heat exchanger having an outer tube and an inner tube;
wherein act (b) includes passing cold waste solids through one of the outer tube and the inner tube; and
wherein act (c) includes passing hot waste solids through the other of the outer tube and the inner tube.

* * * * *